United States Patent
Lyon

(10) Patent No.: US 7,373,420 B1
(45) Date of Patent: May 13, 2008

(54) METHOD AND APPARATUS FOR WEIGHTED FAIR QUEUING

(75) Inventor: Norman Lyon, Hull (CA)

(73) Assignee: Nortel Networks Limited (CA)

( * ) Notice: Subject to any disclaimer, the term of this patent is extended or adjusted under 35 U.S.C. 154(b) by 878 days.

(21) Appl. No.: 10/631,711

(22) Filed: Aug. 1, 2003

(51) Int. Cl.
*G06F 15/16* (2006.01)
*G06F 11/00* (2006.01)

(52) U.S. Cl. ........................ 709/235; 370/229

(58) Field of Classification Search .......... 709/235, 709/223; 370/229–234; 710/39, 200, 240
See application file for complete search history.

(56) References Cited

U.S. PATENT DOCUMENTS

| | | | | |
|---|---|---|---|---|
| 6,014,367 A | * | 1/2000 | Joffe | 370/230 |
| 6,359,861 B1 | * | 3/2002 | Sui et al. | 370/230 |
| 6,810,012 B1 | * | 10/2004 | Yin et al. | 370/230.1 |
| 6,990,115 B2 | * | 1/2006 | Assa et al. | 370/417 |
| 7,023,866 B2 | * | 4/2006 | Giroux et al. | 370/412 |
| 7,099,330 B2 | * | 8/2006 | Chiussi et al. | 370/395.4 |
| 7,187,684 B2 | * | 3/2007 | Goetzinger et al. | 370/412 |

OTHER PUBLICATIONS

Wolf, T. and Decasper, D., CPU Scheduling for Active Processing using Feedback Deficit Round Robin, Sep. 1999, Proceedings of the 37th Allerton Conference on Communication, Control, and Computing, pp. 768-769, Urbana-Champaign, IL.

* cited by examiner

*Primary Examiner*—Krisna Lim
(74) *Attorney, Agent, or Firm*—Anderson Gorecki & Manaras LLP

(57) ABSTRACT

Management of a plurality of queues is made weighted and fair through the introduction of a system of credits. A credit is spent when a fixed-size unit of storage is served from a selected one of the queues. A scheduler selects a queue when an identifier of the queue reaches the head of a service queue. Credits are regained through a distinct credit management method that takes into account a weight associated with each queue. The arrival of new data in a previously empty queue can trigger the inclusion of the previously empty queue in data structures associated with the credit management method.

20 Claims, 15 Drawing Sheets

FIG. 6A

| TIME | DQ | CR | SQ H | SQ T | ACQ H | ACQ T | WCQ H | WCQ T | CREDIT A | CREDIT B | CREDIT C | CELLS A | CELLS B | CELLS C | CM_COUNT A | CM_COUNT B | CM_COUNT C |
|---|---|---|---|---|---|---|---|---|---|---|---|---|---|---|---|---|---|
| 1 | A | A | A,B,C |  | B,C |  | A |  | 0 | 0 | 0 | 14,400 |  | 71 | 0 | 0 | 0 |
| 2 | A | B | A,B,C |  | C,B |  | A |  | -1 | 0 | 0 | 13,400 |  | 71 | 0 | 0 | 0 |
| 3 | A | C | A,B,C |  | B,C |  | A |  | -2 | 1 | 0 | 12,400 |  | 71 | 0 | 1 | 0 |
| 4 | A | B | A,B,C |  | C,B |  | A |  | -3 | 1 | 0 | 11,400 |  | 71 | 0 | 1 | 1 |
| 5 | A | C | B,C |  | B,C |  | A |  | -4 | 2 | 1 | 10,400 |  | 71 | 0 | 2 | 1 |
| 6 | B | B | B,C |  | C |  | A,B |  | -4 | 2 | 2 | 10,399 |  | 71 | 0 | 2 | 2 |
| 7 | B | C | C,B |  | C |  | A,B |  | -4 | 1 | 2 | 10,398 |  | 71 | 0 | 0 | 3 |
| 8 | C | C | B,C |  | C |  | A,B |  | -4 | 1 | 0 | 10,398 |  | 70 | 0 | 0 | 4 |
| 9 | B | C | B,C |  |  |  | A,B |  | -4 | 0 | 0 | 10,397 |  | 70 | 0 | 0 | 5 |
| 10 | B | C | C |  |  |  | A,B,C |  | -4 | -1 | -1 | 10,396 |  | 70 | 0 | 0 | 0 |
| 11 | C | A | C,B |  | B,C |  | A |  | -3 | -1 | 0 | 10,396 |  | 69 | 0 | 1 | 0 |
| 12 | C | B | B,C |  | C,B |  | A |  | -3 | 0 | 0 | 10,396 |  | 68 | 0 | 1 | 1 |
| 13 | C | C | C |  | B,C |  | A |  | -3 | 0 | 0 | 10,395 |  | 67 | 0 | 2 | 1 |
| 14 | B | B | C,B |  | C,B |  | A |  | -3 | 0 | 0 | 10,394 |  | 67 | 0 | 2 | 2 |
| 15 | B | B | B,C |  | B,C |  | A |  | -3 | -1 | 0 | 10,394 |  | 67 | 0 | 0 | 3 |
| 16 | C | C | C |  | C |  | A,B |  | -3 | 0 | 0 | 10,394 |  | 66 | 0 | 0 | 4 |
| 17 | C | C | C,B |  |  |  | A,B |  | -3 | 0 | 0 | 10,393 |  | 65 | 0 | 0 | 5 |
| 18 | C | C | B,C |  |  |  | A,B |  | -3 | -1 | -1 | 10,392 |  | 65 | 0 | 0 | 0 |
| 19 | B | C | B,C |  |  |  | A,B |  | -3 | -2 | -2 | 10,392 |  | 65 | 0 | 0 | 0 |
| 20 | C | C | C |  |  |  | A,B,C |  | -3 | -2 | -2 | 10,392 |  | 64 | 0 | 0 | 0 |

| TIME | DQ | CR | SQ H | SQ T | ACQ H | ACQ T | WCQ H | WCQ T | CREDIT A | CREDIT B | CREDIT C | CELLS A | CELLS B | CELLS C | CM_COUNT A | CM_COUNT B | CM_COUNT C |
|---|---|---|---|---|---|---|---|---|---|---|---|---|---|---|---|---|---|
| 21 | C | A | C | | B,C | | A | | -2, | -2, | 4 | 10,392, | 392, | 63 | 0, | 0, | 0 |
| 22 | C | B | C | | C,B | | A | | -2, | -1, | 3 | 10,392, | 392, | 62 | 0, | 1, | 0 |
| 23 | C | C | C | | B,C | | A | | -2, | -1, | 3 | 10,392, | 392, | 61 | 0, | 1, | 0 |
| 24 | C | B | C,B | | C,B | | A | | -2, | 0, | 2 | 10,392, | 392, | 60 | 0, | 2, | 1 |
| 25 | C | C | B,C | | B,C | | A | | -2, | 0, | 2 | 10,392, | 392, | 59 | 0, | 2, | 1 |
| 26 | B | B | B,C | | C | | A,B | | -2, | 0, | 2 | 10,391, | 392, | 59 | 0, | 0, | 2 |
| 27 | B | C | C | | C | | A,B | | -2, | -1, | 3 | 10,390, | 391, | 59 | 0, | 0, | 2 |
| 28 | C | C | C | | C | | A,B | | -2, | -1, | 3 | 10,390, | 390, | 58 | 0, | 0, | 3 |
| 29 | C | C | C | | C | | A,B | | -2, | -1, | 3 | 10,390, | 390, | 57 | 0, | 0, | 4 |
| 30 | C | C | C | | C | | A,B,C | | -2, | -1, | 3 | 10,390, | 390, | 56 | 0, | 0, | 5 |
| 31 | C | A | C | | B,C | | A | | -2, | -1, | 2 | 10,390, | 390, | 55 | 0, | 1, | 0 |
| 32 | C | B | C,B | | C,B | | A | | -1, | 0, | 1 | 10,390, | 390, | 54 | 0, | 1, | 0 |
| 33 | B | C | B,C | | B,C | | A | | -1, | 0, | 1 | 10,390, | 390, | 53 | 0, | 2, | 1 |
| 34 | C | B | C,B | | C,B | | A | | -1, | -1, | 2 | 10,390, | 389, | 53 | 0, | 2, | 1 |
| 35 | B | C | B,C | | B,C | | A,B | | -1, | 0, | 1 | 10,388, | 388, | 52 | 0, | 0, | 2 |
| 36 | C | B | C,B | | C | | A,B | | -1, | 0, | 1 | 10,388, | 388, | 51 | 0, | 0, | 2 |
| 37 | C | C | B,C | | C | | A,B | | -1, | 0, | 1 | 10,388, | 387, | 51 | 0, | 0, | 3 |
| 38 | C | C | C | | C | | A,B | | -1, | -1, | 2 | 10,387, | 386, | 51 | 0, | 0, | 4 |
| 39 | B | C | C | | C | | A,B | | -1, | -2, | 3 | 10,386, | 386, | 51 | 0, | 0, | 5 |
| 40 | C | C | C | | C | | A,B,C | | -1, | -2, | 3 | 10,386, | 386, | 50 | 0, | 0, | 0 |

FIG. 6B

| +TIME | DQ | CR | SQ H | SQ T | ACQ H | ACQ T | WCQ H | WCQ T | CREDIT -A--B--C | CELLS --A---B---C | CM_COUNT -A--B--C |
|---|---|---|---|---|---|---|---|---|---|---|---|
| +41 | C | A |   | C,A | B,C |   | A |   | 0, -2, 2 | 10,386, 49 | 0, 0, 0 |
| +42 | C | B | A,C |   | C,B |   | A |   | 0, -1, 1 | 10,386, 48 | 0, 1, 0 |
| +43 | A | C | A,C |   | B,C |   | A |   | -1, -1, 2 | 9,386, 48 | 0, 1, 1 |
| +44 | A | B | A,C,B |   | C,B |   | A |   | -2, 0, 2 | 8,386, 48 | 0, 2, 1 |
| +45 | A | C | A,C,B |   | B,C |   | A |   | -3, 0, 3 | 7,386, 48 | 0, 2, 2 |
| +46 | A | B | A,C,B |   | C |   | A,B |   | -4, 1, 3 | 6,386, 48 | 0, 0, 2 |
| +47 | A | C | C,B |   | C |   | A,B |   | -5, 1, 4 | 5,386, 48 | 0, 0, 3 |
| +48 | C | C | B,C |   | C |   | A,B |   | -5, 1, 4 | 5,386, 47 | 0, 0, 4 |
| +49 | B | C | B,C |   | C |   | A,B |   | -5, 0, 5 | 5,386, 47 | 0, 0, 5 |
| +50 | B | C | C |   |   |   | A,B,C |   | -5, -1, 6 | 5,384, 46 | 0, 0, 0 |
| +51 | C | A | C |   | B,C |   | A |   | -4, -1, 5 | 5,384, 45 | 0, 0, 0 |
| +52 | C | B | C,B |   | C,B |   | A |   | -4, 0, 4 | 5,384, 44 | 0, 1, 0 |
| +53 | C | C | B,C |   | B,C |   | A |   | -4, 0, 4 | 5,384, 44 | 0, 1, 1 |
| +54 | B | B | B,C |   | C,B |   | A |   | -4, 0, 5 | 5,383, 44 | 0, 2, 1 |
| +55 | B | C | C |   | C |   | A,B |   | -4, -1, 5 | 5,382, 44 | 0, 2, 2 |
| +56 | C | B | C,B |   | B,C |   | A |   | -4, 0, 4 | 5,382, 43 | 0, 0, 2 |
| +57 | C | C | B,C |   | C |   | A,B |   | -4, 0, 4 | 5,382, 42 | 0, 0, 3 |
| +58 | B | C | B,C |   | C |   | A,B |   | -4, -1, 5 | 5,381, 42 | 0, 0, 4 |
| +59 | B | C | C |   | C |   | A,B |   | -4, -2, 6 | 5,380, 42 | 0, 0, 5 |
| +60 | C | C | C |   | C |   | A,B,C |   | -4, -2, 6 | 5,380, 41 | 0, 0, 0 |

FIG. 6C

| +TIME | DQ | CR | SQ H | SQ T | ACQ H | ACQ T | WCQ H | WCQ T | CREDIT A,B,C | CELLS A,B,C | CM_COUNT A,B,C |
|---|---|---|---|---|---|---|---|---|---|---|---|
| 61 | C | A | C |   | B,C |   | A |   | -3, -2, 5 | 5,380, 40 | 0, 0, 0 |
| 62 | C | B | C |   | C,B |   | A |   | -3, -1, 4 | 5,380, 39 | 0, 0, 1 |
| 63 | C | C | C |   | B,C |   | A |   | -3, -1, 4 | 5,380, 38 | 0, 1, 0 |
| 64 | C | B | C,B |   | C,B |   | A |   | -3, 0, 3 | 5,380, 37 | 0, 1, 1 |
| 65 | C | C | C,B |   | B,C |   | A |   | -3, 0, 3 | 5,380, 36 | 0, 2, 1 |
| 66 | B | B | B,C |   | C |   | A,B |   | -3, 0, 4 | 5,380, 36 | 0, 2, 2 |
| 67 | B | C | B,C |   | C |   | A,B |   | -3, -1, 4 | 5,379, 36 | 0, 2, 2 |
| 68 | C | C | C |   | C |   | A,B |   | -3, -1, 4 | 5,378, 35 | 0, 0, 3 |
| 69 | C | C | C |   | C |   | A,B |   | -3, -1, 4 | 5,378, 34 | 0, 0, 4 |
| 70 | C | C | C |   |   |   | A,B,C |   | -3, -1, 3 | 5,378, 33 | 0, 0, 5 |
| 71 | C | A | C |   | B,C |   | A |   | -2, -1, 2 | 5,378, 32 | 0, 0, 0 |
| 72 | C | B | C |   | C,B |   | A |   | -2, 0, 2 | 5,378, 31 | 0, 1, 0 |
| 73 | B | C | C,B |   | B,C |   | A |   | -2, 0, 2 | 5,378, 30 | 0, 1, 1 |
| 74 | B | B | B,C |   | C,B |   | A |   | -2, 0, 3 | 5,377, 30 | 0, 2, 1 |
| 75 | C | C | B,C |   | B,C |   | A |   | -2, -1, 2 | 5,376, 30 | 0, 2, 2 |
| 76 | C | B | C |   | C |   | A,B |   | -2, 0, 2 | 5,376, 29 | 0, 0, 2 |
| 77 | B | C | C,B |   | C |   | A,B |   | -2, 0, 3 | 5,376, 28 | 0, 0, 3 |
| 78 | B | C | B,C |   | C |   | A,B |   | -2, -1, 3 | 5,375, 28 | 0, 0, 4 |
| 79 | C | C | B,C |   | C |   | A,B |   | -2, -2, 4 | 5,374, 28 | 0, 0, 5 |
| 80 | C | C | C |   | C |   | A,B,C |   | -2, -2, 4 | 5,374, 27 | 0, 0, 0 |

FIG. 6D

| +TIME | DQ | CR | SQ H | SQ T | ACQ H | ACQ T | WCQ H | WCQ T | CREDIT A | CREDIT B | CREDIT C | CELLS A | CELLS B | CELLS C | CM_COUNT A | CM_COUNT B | CM_COUNT C |
|---|---|---|---|---|---|---|---|---|---|---|---|---|---|---|---|---|---|
| 81 | C | A | C |  | B | C | A |  | -1 | -2 | 3 | 5 | 374 | 26 | 0 | 0 | 0 |
| 82 | C | B | C |  | C | B | A |  | -1 | -1 | 2 | 5 | 374 | 25 | 0 | 0 | 0 |
| 83 | C | C | C |  | B | C | A |  | -1 | -1 | 2 | 5 | 374 | 24 | 0 | 1 | 0 |
| 84 | C | B | C | B | C | B | A |  | -1 | -1 | 1 | 5 | 374 | 23 | 0 | 1 | 1 |
| 85 | C | C | B,C |  | B | C | A |  | -1 | 0 | 1 | 5 | 374 | 22 | 0 | 2 | 1 |
| 86 | B | B | B,C |  | C |  | A,B |  | -1 | 0 | 1 | 5 | 373 | 22 | 0 | 2 | 2 |
| 87 | B | C | C |  | C |  | A,B |  | -1 | -1 | 2 | 5 | 372 | 22 | 0 | 0 | 2 |
| 88 | C | C | C |  | C |  | A,B |  | -1 | -1 | 2 | 5 | 372 | 21 | 0 | 0 | 3 |
| 89 | C | C | C |  | C |  | A,B |  | -1 | -1 | 2 | 5 | 372 | 20 | 0 | 0 | 4 |
| 90 | C | C | C |  | C |  | A,B,C |  | -1 | -1 | 2 | 5 | 372 | 19 | 0 | 0 | 5 |
| 91 | C | A | C,A |  | B | C | A |  | 0 | -1 | 1 | 5 | 372 | 18 | 0 | 0 | 0 |
| 92 | A | B | A,C | B | C | B | A |  | 0 | 0 | 0 | 5 | 372 | 17 | 0 | 1 | 0 |
| 93 | A | C | A,C | B | B | C | A |  | -1 | 0 | 1 | 4 | 372 | 17 | 0 | 1 | 1 |
| 94 | A | B | A,C | B | C | B | A |  | -2 | 1 | 2 | 3 | 372 | 17 | 0 | 2 | 1 |
| 95 | A | C | A,C | B | B | C | A |  | -3 | 1 | 3 | 2 | 372 | 17 | 0 | 2 | 2 |
| 96 | A | B | A,C | B | C |  | A |  | -4 | 2 | 3 | 1 | 372 | 17 | 0 | 0 | 2 |
| 97 | C | C | C | B | C |  | A,B |  | -5 | 2 | 4 | 0 | 372 | 16 | 0 | 0 | 3 |
| 98 | B | C | B,C |  | C |  | A,B |  | -5 | 1 | 5 | 0 | 372 | 16 | 0 | 0 | 4 |
| 99 | B | C | B,C |  | C |  | A,B |  | -5 | 0 | 5 | 0 | 371 | 16 | 0 | 0 | 5 |
| 100 | B | C | C,B |  | C |  | A,B,C |  | -5 | 0 | 5 | 0 | 370 | 16 | 0 | 0 | 0 |

FIG. 6E

| TIME | DQ | CR | SQ H | SQ T | ACQ H | ACQ T | WCQ H | WCQ T | CREDIT A | CREDIT B | CREDIT C | CELLS A | CELLS B | CELLS C | CM_COUNT A | CM_COUNT B | CM_COUNT C |
|------|----|----|------|------|-------|-------|-------|-------|----------|----------|----------|---------|---------|---------|------------|------------|------------|
| 101 | C | A | B | B,C | B,C |  | A |  | -4 | 0 | 4 | 0 | 370 | 15 | 0 | 0 | 0 |
| 102 | B | B | B | B,C | C,B |  | A |  | -4 | 0 | 4 | 0 | 369 | 15 | 0 | 0 | 0 |
| 103 | B | C | C |  | B,C |  | A |  | -4 | -1 | 5 | 0 | 368 | 15 | 0 | 1 | 0 |
| 104 | C | B | C,B |  | C,B |  | A |  | -4 | 0 | 4 | 0 | 368 | 14 | 0 | 1 | 1 |
| 105 | C | C | B | B,C | B,C |  | A |  | -4 | 0 | 4 | 0 | 368 | 13 | 0 | 2 | 1 |
| 106 | B | B | B | B,C | C |  | A,B |  | -4 | -1 | 5 | 0 | 367 | 13 | 0 | 2 | 2 |
| 107 | C | C | C |  | C |  | A,B |  | -4 | -1 | 5 | 0 | 366 | 13 | 0 | 0 | 2 |
| 108 | C | C | C |  | C |  | A,B |  | -4 | -1 | 5 | 0 | 366 | 12 | 0 | 0 | 3 |
| 109 | C | C | C |  |  |  | A,B |  | -4 | -1 | 5 | 0 | 366 | 11 | 0 | 0 | 4 |
| 110 | C | C | C |  |  |  | A,B,C |  | -4 | -1 | 5 | 0 | 366 | 10 | 0 | 0 | 5 |
| 111 | C | A | C |  | B,C |  | A |  | -4 | -1 | 4 | 0 | 366 | 9 | 0 | 0 | 0 |
| 112 | B | B | C,B |  | C,B |  | A |  | -3 | -1 | 3 | 0 | 366 | 8 | 0 | 1 | 0 |
| 113 | B | C | B | B,C | B,C |  | A |  | -3 | 0 | 3 | 0 | 366 | 7 | 0 | 1 | 0 |
| 114 | C | B | C |  | C,B |  | A |  | -3 | 0 | 3 | 0 | 366 | 7 | 0 | 2 | 0 |
| 115 | C | C | C,B |  | B,C |  | A |  | -3 | -1 | 4 | 0 | 365 | 6 | 0 | 2 | 1 |
| 116 | B | B | B | B,C | C |  | A,B |  | -3 | 0 | 3 | 0 | 364 | 5 | 0 | 0 | 1 |
| 117 | C | C | C |  | C |  | A,B |  | -3 | 0 | 3 | 0 | 364 | 5 | 0 | 0 | 2 |
| 118 | B | B | B | B,C | C |  | A,B |  | -3 | -1 | 4 | 0 | 364 | 5 | 0 | 0 | 3 |
| 119 | B | C | C |  |  |  | A,B |  | -3 | -2 | 5 | 0 | 363 | 5 | 0 | 0 | 4 |
| 120 | C | A | C |  | B |  | A |  | -2 | -2 | 4 | 0 | 362 | 4 | 0 | 0 | 4 |

FIG. 6F

| +TIME | DQ | CR | SQ H--T | ACQ H--T | WCQ H--T | CREDIT -A--B--C | CELLS --A--B--C | CM_COUNT -A--B--C |
|---|---|---|---|---|---|---|---|---|
| 121 | C | B | C | B | A | -2, -1, 3 | 0, 362, 3 | 0, 1, 4 |
| 122 | C | B | C,B | B | A | -2, 0, 2 | 0, 362, 2 | 0, 2, 4 |
| 123 | C | B | B,C | | A,B | -2, 1, 1 | 0, 362, 1 | 0, 0, 4 |
| 124 | B | A | B,C | B | A | -1, 0, 1 | 0, 361, 1 | 0, 0, 4 |
| 125 | B | B | C,B | B | A | -1, 0, 1 | 0, 360, 1 | 0, 1, 4 |
| 126 | C | B | B | B | A | -1, 1, 1 | 0, 360, 1 | 0, 2, 4 |
| 127 | B | B | B | B | A | -1, 1, 0 | 0, 359, 0 | 0, 0, 4 |
| 128 | B | A | B | B | A,B | -1, 0, 0 | 0, 358, 0 | 0, 0, 4 |
| 129 | B | B | B | B | | 0, 0, 0 | 0, 357, 0 | 0, 1, 4 |
| 130 | B | B | B | B | B | 0, 0, 0 | 0, 356, 0 | 0, 2, 4 |
| 131 | B | B | B | B | | 0, 0, 0 | 0, 355, 0 | 0, 0, 4 |
| 132 | B | B | B | B | B | 0, 0, 0 | 0, 354, 0 | 0, 1, 4 |
| 133 | B | B | B | B | | 0, 0, 0 | 0, 353, 0 | 0, 2, 4 |
| 134 | B | B | B | B | B | 0, 0, 0 | 0, 352, 0 | 0, 0, 4 |
| 135 | B | B | B | B | | 0, 0, 0 | 0, 351, 0 | 0, 1, 4 |
| 136 | B | B | B | B | B | 0, 0, 0 | 0, 350, 0 | 0, 2, 4 |
| 137 | B | B | B | B | | 0, 0, 0 | 0, 349, 0 | 0, 0, 4 |
| 138 | B | B | B | B | | 0, 0, 0 | 0, 348, 0 | 0, 1, 4 |
| 139 | B | B | B | B | | 0, 0, 0 | 0, 347, 0 | 0, 2, 4 |
| 140 | B | B | B | B | | 0, 0, 0 | 0, 346, 0 | 0, 0, 4 |

FIG. 6G

METHOD AND APPARATUS FOR WEIGHTED FAIR QUEUING

FIELD OF THE INVENTION

The present invention relates to queuing in data communication systems and, in particular, to method and apparatus for weighted fair queuing.

BACKGROUND

When several flows of data are passing through a network device, it may be that the rate that data is received exceeds the rate at which the data may be transmitted. As such, some of the data received must be held temporarily in queues. Queues represent memory locations where data may be held before being transmitted by the network device. Fair queuing is the name given to queuing techniques that allow each flow passing through a network device to have a fair share of network resources.

An exemplary fair queuing technique, called Deficit Round Robin (DRR) allocates bandwidth fairly among competing flows. Packets in a number of flows arriving at a network device are mapped to a number of queues. This number of queues is much less than the number of flows. A scheduler using DRR traverses the queues in a round robin manner attempting to serve a predefined quantity (a quantum) of data from each queue. Additionally, a deficit counter is associated with each queue. In each round, the scheduler increases the deficit counter of a given queue by the quantum. The deficit counter is then decreased by the amount of data served from the queue.

For example, if the quantum of a given scheduler is 1000 bytes and a queue has a 1500 byte packet to be served, the first time the queue is traversed by the given scheduler, the packet may not be served, because the packet is larger than the value (1000) in the deficit counter. In the next round, however, the packet may be served, because the packet is smaller than the value (2000) in the deficit counter. If the packet is served in the next round, the value in the deficit counter is reduced to 500.

Other known queuing techniques include Carry Over Round Robin and the classic Packetized General Processor Sharing. However, these techniques and Deficit Round Robin are recognized to show a marked increase in complexity as the number of queues served increases.

SUMMARY

A scheduling technique that quantizes data, and hence bandwidth precision, may be shown to exhibit a minimal increase in complexity as the number of queues served increases. In common with some known scheduling methods, credits are allocated to queues in a credit management process and these credits are spent when data is dequeued from the queues in a dequeue process. In contrast to these known scheduling methods, however, the credit management process is distinct from the dequeue process.

In accordance with an aspect of the present invention there is provided a method of serving a plurality of entities that store packets of data traffic to be transmitted, the data traffic stored in fixed-size units of storage. The method includes associating a credit count with each of the plurality of entities, selecting a given one of the plurality of entities, transmitting data from one the fixed-size unit of storage in the given one of the plurality of entities, reducing, by a predetermined quantity, the credit count associated with the given one of the plurality of entities and determining whether further fixed-size units of storage are to be transmitted from the given one of the plurality of entities. In other aspects of the present invention there is provided scheduler adapted to serve a plurality of entities using this method and a computer readable medium for allowing a general purpose computer to perform this method.

In accordance with another aspect of the present invention there is provided a method of distributing credits among a plurality of entities that store packets of data traffic to be transmitted. The method includes associating a credit count with each of the plurality of entities, selecting a given entity identifier from a first ordered list of entity identifiers, where the given entity identifier is associated with a given one of the plurality of entities and increasing, by a predetermined quantity, the associated credit count of the given one of the plurality of entities. In other aspects of the present invention there is provided scheduler adapted to serve a plurality of entities using this method and a computer readable medium for allowing a general purpose computer to perform this method.

In accordance with another aspect of the present invention there is provided a method of managing credits distributed among a plurality of entities adapted to store packets of data traffic to be transmitted. The method includes associating a credit count with each of the plurality of entities, determining that a given one of the plurality of entities has received data and placing an entity identifier associated with the given one of the plurality of entities in an ordered list of entity identifiers, where the ordered list of entity identifiers is used when distributing credits among a plurality of entities. In other aspects of the present invention there is provided scheduler adapted to serve a plurality of entities using this method and a computer readable medium for allowing a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 6A illustrates a trace of queue states for an example for times 1-20;

FIG. 6B illustrates a trace of queue states for the example started in FIG. 6A for times 21-40;

FIG. 6C illustrates a trace of queue states for the example started in FIG. 6A for times 41-60;

FIG. 6D illustrates a trace of queue states for the example started in FIG. 6A for times 61-80;

FIG. 6E illustrates a trace of queue states for the example started in FIG. 6A for times 81-100;

FIG. 6F illustrates a trace of queue states for the example started in FIG. 6A for times 101-120; and FIG. 6G illustrates a trace of queue states for the example started in FIG. 6A for times 121-140.

DETAILED DESCRIPTION

Figure 1:
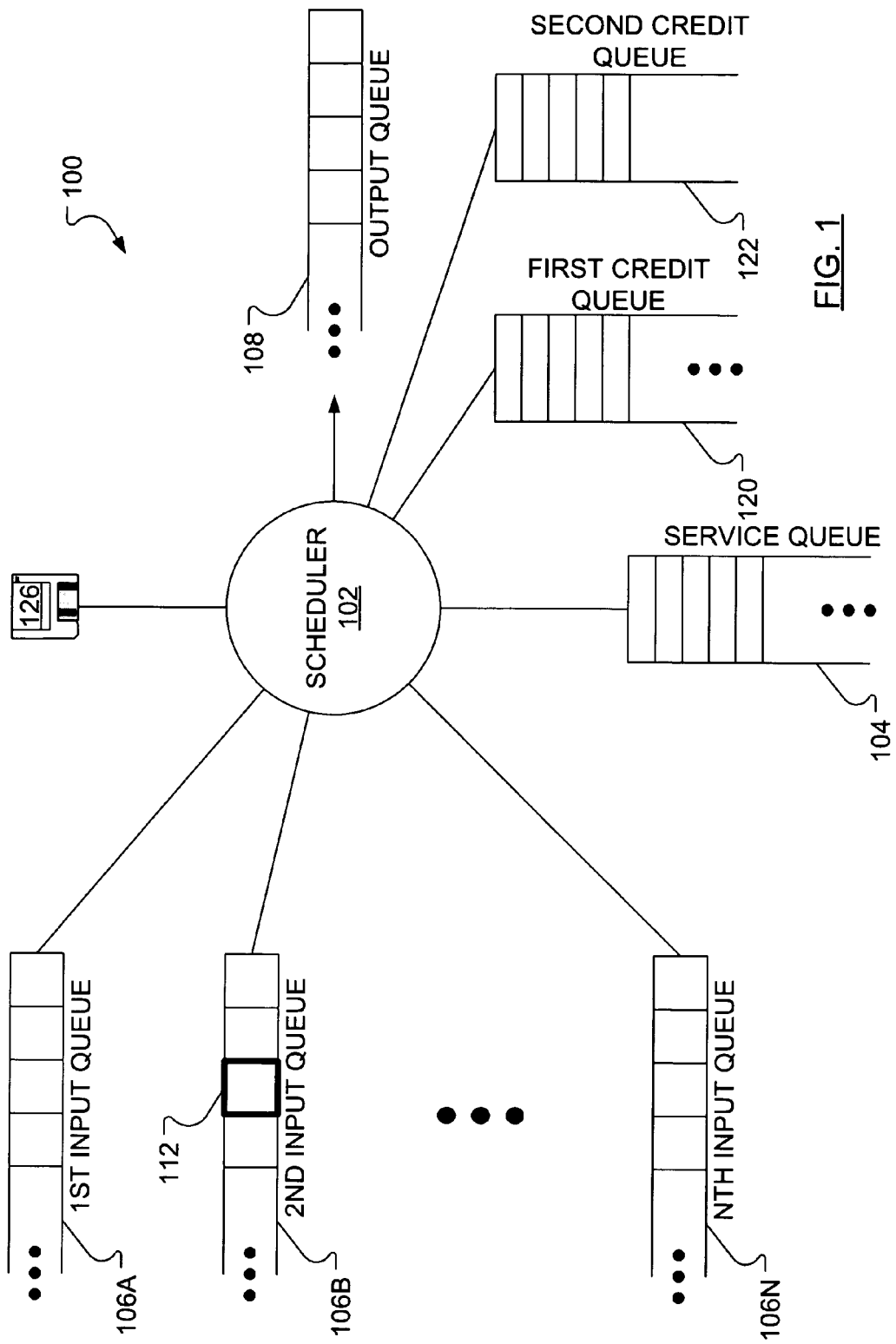
FIG. 1 illustrates a queue manager, according to an embodiment of the present invention, including a number of exemplary queues in communication with a scheduler.

FIG. 1 illustrates a queue manager 100 including a number of exemplary queues in communication with a scheduler 102. In more simple terms, the queue manager 100 includes a memory that is organized into a number of queues and a processor adapted to act as a scheduler. The exemplary queues include a first input queue 106A, a second input queue 106B and an Nth input queue 106N (referred to hereinafter collectively or individually as 106). As will become apparent, the input queues 106 may more generically be called "entities" to encompass the possibility that something other than a queue, for example, another scheduler, may take the place of one or more of the input queues 106. Associated with the scheduler 102 is a service queue 104, an output queue 108 and two credit queues, namely a first credit queue 120 and a second credit queue 122.

Each input queue 106 stores incoming packets of data. The term "packet" is selected to represent a protocol data unit, which, for example, may be an Internet Protocol (IP) packet, a cell in an Asynchronous Transfer Mode (ATM) communication system or a frame of data in another communication system. Each input queue 106 stores incoming packets in fixed-size units of storage, which may be called cell buffers. Notably, the size of the cell buffers in the input queues 106 may be smaller than the maximum size of packet that the queue manager 100 is expected to handle. As such, a large packet may occupy more than one cell buffer. An exemplary cell buffer 112 is indicated in FIG. 1.

Each of the functions of the scheduler 102 can be implemented in application-specific hardware, which is the preferred implementation when high speed is a requirement. However, in an alternative implementation, the scheduler 102 may be loaded with queue management software for executing methods exemplary of this invention from a software medium 126 which could be a disk, a tape, a chip or a random access memory containing a file downloaded from a remote source.

In overview, the scheduler 102 schedules service amongst competing input queues 106. That is, the scheduler 102 determines when a cell buffer-worth of data will be transferred from a given input queue 106 to the output queue 108. Each of the competing input queues 106 has associated parameters including a weight, a credit count and a credit limit. The credit limit associated with a given input queue 106 is a measure of data in the given input queue 106. As such, the credit limit may be represented, for example, as a number of cell buffers. The scheduler 102 may be described as "work conserving". That is, every time the scheduler 102 runs, the scheduler 102 selects an input queue 106 for service. To organize this selecting, the scheduler 106 is adapted to perform multiple processes including a dequeue process and a credit management process.

The dequeue process involves the service queue 104, which is an ordered list of the identifiers of those input queues 106 that are holding packets waiting for service. When a packet processor external to the scheduler 102 receives a packet and places the packet in a given input queue 106, the packet processor informs the scheduler 102. In response, the scheduler 102 may place an identifier of the given input queue 106 in the service queue 104. However, the placement of such an identifier in the service queue 104 is subject to the conditions that the given input queue 106 has a credit count above a predetermined threshold and that an identifier of the given input queue 106 is not already in the service queue 104. The dequeue process allows the scheduler 102 to select, for service, the input queue 106 whose identifier is at the head of the service queue 104. According to the dequeue process, the scheduler 102 transfers a packet, cell buffer by cell buffer, from the selected input queue 106 to the output queue 108. While serving the selected input queue 106, the scheduler 102 decrements the credit count of the input queue 106 being served. In particular, the credit count of the input queue 106 is reduced by one credit (where a credit corresponds to a cell buffer) for every cell buffer-worth of data that is dequeued.

When the entire packet has been dequeued, if the credit count of the served input queue 106 is found to be less than the credit limit of the served input queue 106 and if the served input queue 106 is not currently in the data structures of the credit management process (i.e., the credit queues 120, 122), the dequeue process then requires that the scheduler 102 pass the identifier of the served input queue 106 to the credit management process.

The credit management process allows the scheduler 102 to select an input queue 106 to receive a credit. The credit management process requires that the scheduler 102 increment the credit count of the input queue 106 selected to receive a credit. If the credit count of the input queue 106 selected to receive a credit surpasses a predetermined threshold (e.g., zero), the credit management process allows the scheduler 102 to place an identifier of the selected input queue 106 in the service queue 104, subject to the condition that an identifier of the selected input queue 106 is not already in the service queue 104.

When the queue manager 100 is initialized, all of the input queues 106 may be initialized to have a credit count of zero. It may be stipulated that an input queue 106 must have a credit count above a predetermined threshold (say, zero) to be entered in the service queue 104. Each time a cell buffer 112 of data is served from a given input queue 106, the credit count of the given input queue 106 may be reduced by one credit, i.e., one credit may be "spent". The credit count of an input queue 106 is allowed to become negative so that a complete packet may be served. For every credit spent, the credit management process redistributes the credit. The credit management process may thus be described as credit-conserving, that is, the sum of credits is constant (e.g., always zero). The rate of earning new credits at a given input queue 106, relative to the other input queues 106, is related to the weight associated with the given input queue 106. The credit limit of a given input queue 106 is limited to the number of cell buffers occupied in the given input queue 106.

Notably, the scheduler 102 does not need to know the length of a packet at the start of packet. Instead, a marking scheme may be implemented so that it is only necessary that the scheduler 102 recognize the cell buffer 112 that is the last of a given packet. The length of the given packet, measured in cell buffers, is, therefore, implicit. Thus, the scheduler 102 may be able to schedule service to entities that contain packets of variable length.

For the case where the packets are ATM cells, there are two ways to use such a marking scheme. For basic ATM service, assuming that the cell buffers are sized to hold a single cell, every cell may be marked the last of a packet. Such marking may be said to result in cell interleaving. For advanced ATM service, the end of an ATM adaptation layer 5 packet may be marked the last of the packet. This latter type of marking may be said to result in a "VC Merge".

As will be apparent to a person skilled in the art, the ATM adaptation layer (AAL) prepares cells for transmission over the ATM network. At the sending end, variable length packets may be segmented into fixed-length cells and may be reassembled at the receiving end. There are five different AAL protocols, each designed to optimize transport of traffic types with different requirements and characteristics. Each has different characteristics in terms of bit rate profile, connection-oriented/connectionless nature and timing characteristics. The most commonly used ATM adaptation layer encapsulations are AAL1 and AAL5. AAL5 is the most popular ATM adaptation layer protocol used for data transmission. AAL5 is connection-oriented and supplies a variable bit rate.

The queue manager 100 may efficiently implement a marking scheme as follows. A single bit flag, indicating the end-of-packet cell buffer, may be stored with a pointer pointing to the last cell buffer of a packet. The service of the second last buffer of a packet causes the flag for the final buffer to be loaded into memory associated with the scheduler 102, so that the scheduler 102 is aware, while serving the final buffer, that the buffer is the final buffer of the packet.

As has been stated hereinbefore, the scheduler 102 may be adapted to serve other schedulers in place of the input queues 106. The term "entity" is now introduced to refer to either another scheduler or an input queue 106. In one aspect of the present invention, the amount of data held in an entity may be required to be known by the scheduler 102 for associating a credit limit with the entity. This requirement to know the amount of data held by an entity poses a problem when the scheduler 102 is to serve non-work-conserving schedulers. One example of a non-work-conserving scheduler is called a "shaper". The data held by an entity limits the credit earned. This limit is put in place to prevent scheduler deadlock, which occurs when a queue has been emptied of data, yet maintains a credit count above the predetermined threshold. Since the total number of credits is set, a surplus of credits at one entity means a deficit of credits at least one other entity. An entity in deficit will not be served by the scheduler 102.

The scheduler 102 may be required to maintain a record of the amount of data held at an entity that is eligible for immediate service. However, even if a shaper could indicate the total data held at the shaper, it may be very difficult to implement a calculation of how much of the total data held at the shaper is immediately eligible for service. In serving a shaper, a controlled burst of service is frequently desirable.

It is known that shapers operate under traffic contracts that specify data rates. A shaper may have several connections coincidentally become eligible for immediate service at the same time. Inevitably, service will be delayed to one or more of these connections so that another connection may be served. Such delays cannot always be recovered to the extent that the traffic contract parameters are met. Where such a shaper is served by the scheduler 102, the shaper may be prevented from achieving a maximum shaped rate. Furthermore, the efficiency of such served shapers may be reduced.

To address the shaper-related limitations, data held in a shaper may be approximated to 0 or 1 since it is easy for a shaper to indicate when it has something to send. Notably, the credit limit associated with the shaper may be either 0 or 1, according to the estimation of the data held. Alternatively, at the scheduler 102, the shapers may be initialized with a positive number of credits (rather than zero). The corresponding credit limit is always the positive number. In addition, or alternatively, a given shaper may be allowed a controlled amount of service, possibly greater than a single packet, when the given shaper reaches the head of the service queue 104. Such a scheme gives shapers a favorable bias over non-shapers. However, this bias may be controlled to prevent abuse.

Figure 2:
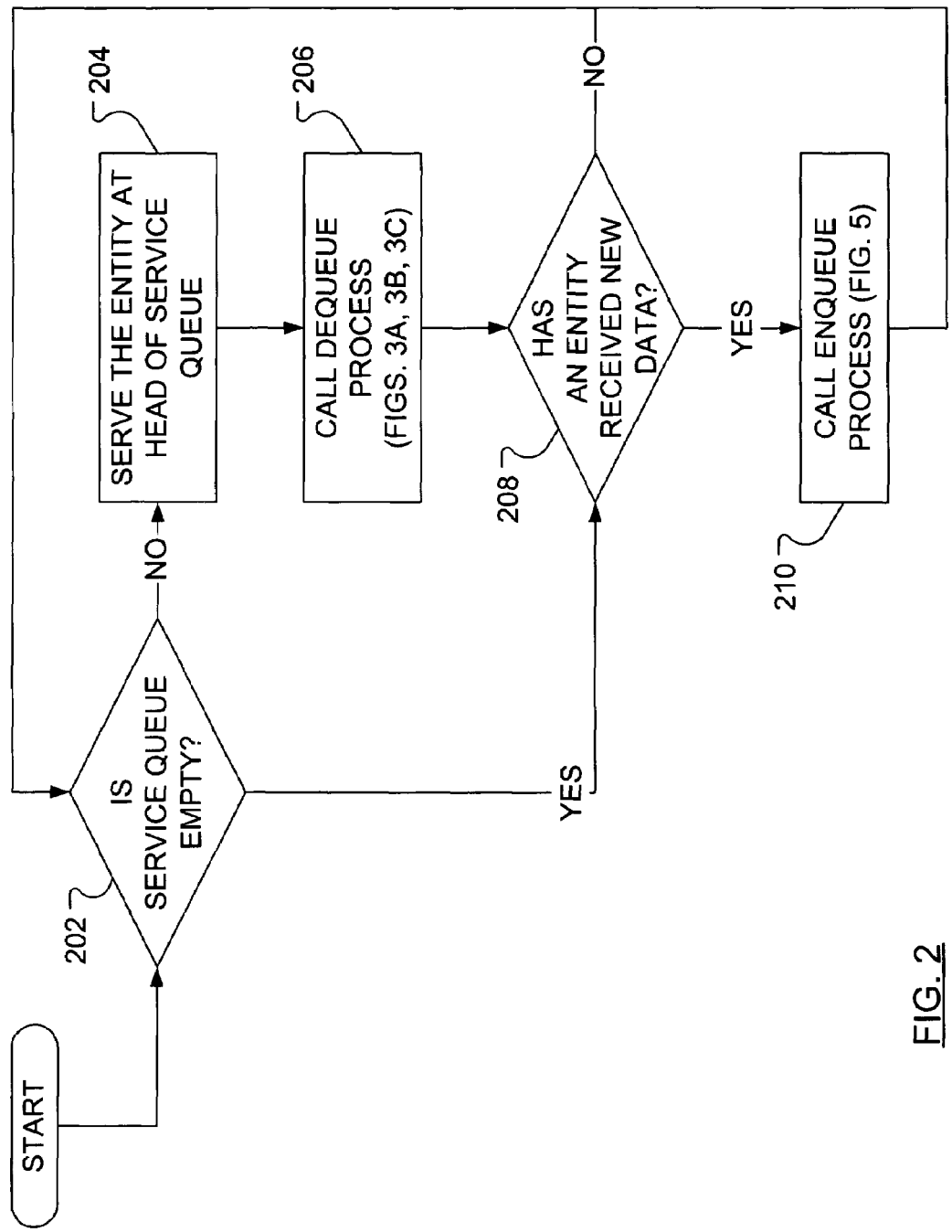
FIG. 2 illustrates steps of an overall queue management method according to an embodiment of the present invention.
Figure 3A:
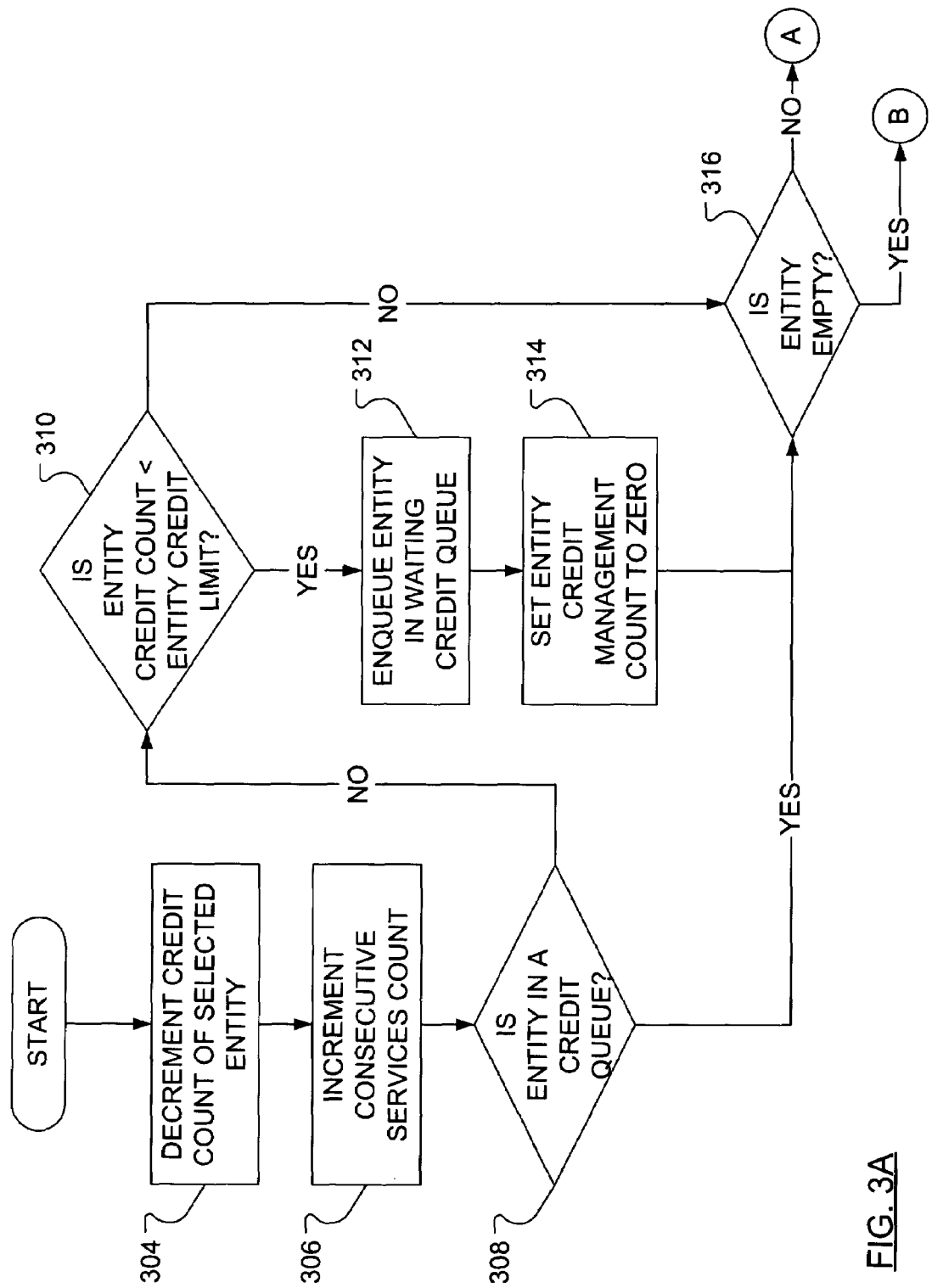
FIG. 3A illustrates initial steps of a dequeue process according to an embodiment of the present invention.
Figure 3B:
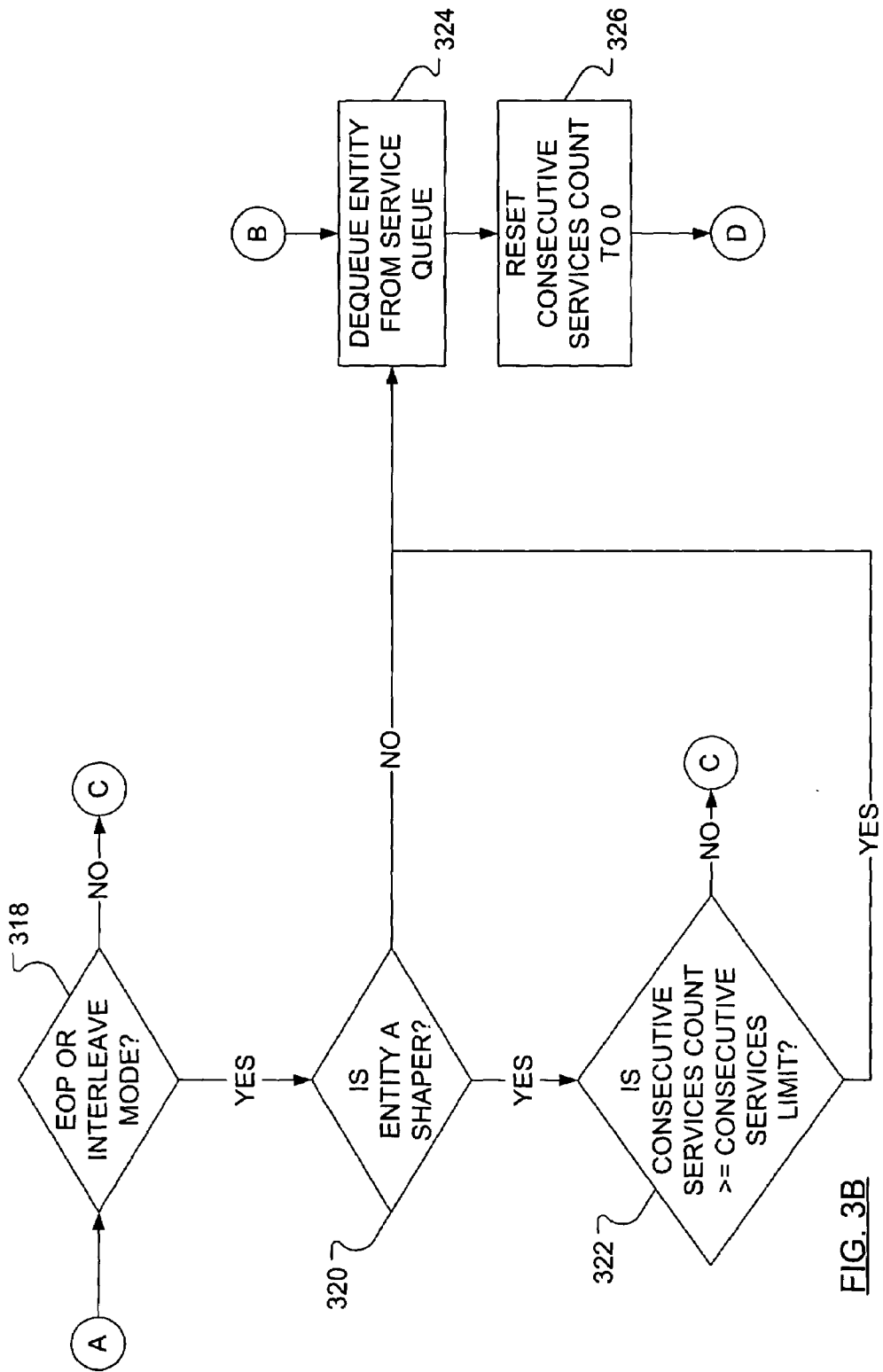
FIG. 3B illustrates intermediate steps of the dequeue process begun in FIG. 3A.
Figure 3C:
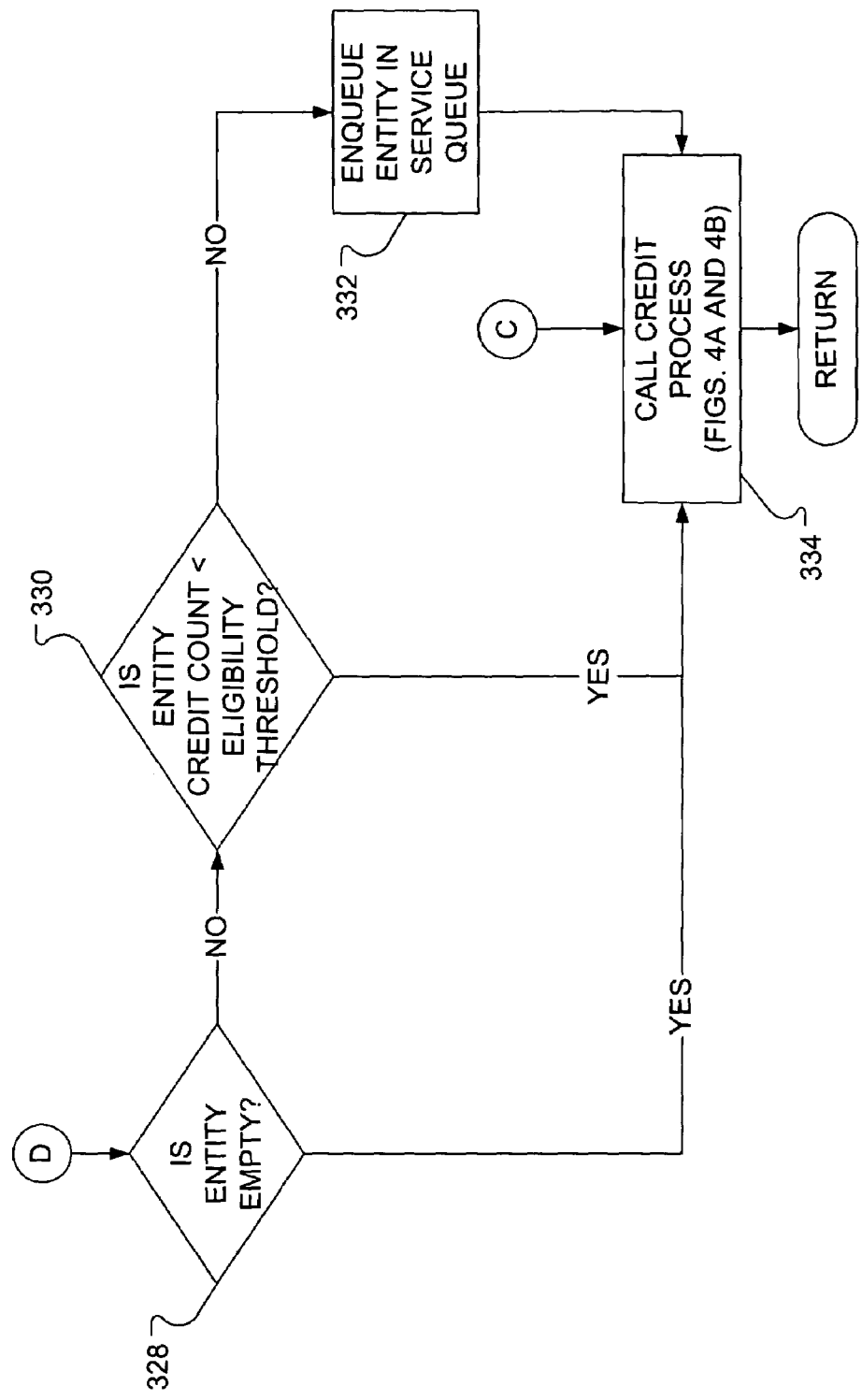
FIG. 3C illustrates final steps of the dequeue process begun in FIG. 3A.

The scheduling process is presented in overview in FIG. 2. Initially, it is determined (step 202) whether there are any entities identified in the service queue 104 as requiring service. Where there are entities identified in the service queue 104, the entity identified at the head of the service queue 104 is served by the scheduler 102 (step 204), i.e., the scheduler 102 transfers a cell buffer-worth of data from the entity to the output queue 108. A dequeue process is then called (step 206). The dequeue process, which will be described in detail hereinafter in conjunction with FIGS. 3A, 3B and 3C, is used to determine whether the identifier of the served entity should remain at the head of the service queue 104, be moved to the tail of the service queue 104 or should be removed from the service queue 104 completely. Additionally, the dequeue process calls a credit management process, which will be described in detail hereinafter in conjunction with FIGS. 4A and 4B, to manage the redistribution of the credit that was spent when, in step 204, the selected entity was served.

It is then determined whether any of the entities have received new data (step 208). If one or more entities have received new data, each of the entities that have received new data become the subject of an enqueue process (step 210), which will be described in detail hereinafter in conjunction with FIG. 5. The enqueue process enables those entities that have not had data to send to have entity identifiers enqueued in the service queue 104 and the credit queues 120, 122. The position in the service queue 104 and the credit queues 120, 122 of identifiers of entities already containing data remain unaltered by the enqueue process.

The credit queues 120, 122 may considered to include an active credit queue and a waiting credit queue. As will be more fully understood after a review of the following, the credit management process allocates credits to entities identified in the active credit queue. When an entity is no longer eligible to receive credits in a particular round, the identifier of that entity is placed in the waiting credit queue. In the following, it may be initially assumed that the active credit queue is the first credit queue 120 and the waiting credit queue is the second credit queue 122.

FIGS. 3A, 3B and 3C together provide an overview of the steps of a dequeue process undertaken by the scheduler 102 when the entities 106 have packets to be served. Initially (see FIG. 3A), the entity identified at the head of the service queue 104 is selected (step 302). As the entity has been served (see step 204, FIG. 2), the credit count of the selected entity is decremented (step 304). A consecutive services count for the scheduler 102 is then incremented (step 306). The consecutive services count is to manage shapers. Through the use of the consecutive services count, several cell buffers (as controlled by a consecutive services limit)

may be served from the shaper before moving the identifier of the shaper to the end of the service queue 104 rather than a single cell buffer. It is then determined whether the entity is present in one of the credit queues (step 308), i.e., either the active credit queue 120 or the waiting credit queue 122. If the entity is not present in either of the credit queues, it is determined whether the credit count of the entity is less than the entity credit limit (step 310). If the credit count of the entity is less than the entity credit limit, the entity is enqueued in the waiting credit queue (step 312) and the credit management count of the entity is set to zero (step 314).

After setting the credit management count to zero, it is determined whether the entity is empty (step 316). Step 316 is also performed when it is determined (step 308) that the entity is already present in one of the credit queues or it is determined (step 310) that the credit count of the entity is greater than, or equal to, the entity credit limit.

If it is determined that the entity is not empty, then there is at least one cell buffer-worth of data to be served from the entity and it is determined whether the cell buffer to be served contains the end of the packet being served or whether the entity is in "interleave mode" (step 318, see FIG. 3B). In interleave mode, only one cell buffer-worth of data is served from the entity (rather than an entire packet-worth) each time the identifier of the packet reaches the head of the service queue 104. If the cell buffer to be served contains the end of the packet or the entity is in interleave mode, it is determined whether the entity is a shaper (step 320). If the entity is a shaper, it is determined whether the consecutive services count associated with the shaper is greater than, or equal to, the consecutive services limit associated with the shaper (step 322). If the consecutive services count is less than the consecutive services limit, the shaper may remain in the service queue 104. However, if the consecutive services count is greater than, or equal to, the consecutive services limit, the shaper is dequeued from the service queue 104 (step 324). Additionally, if the entity is not a shaper, the entity is dequeued from the service queue 104 (step 324) without regard for the consecutive services count. After dequeuing the entity from the service queue 104, the consecutive services count is reset to zero (step 326).

Figure 4A:
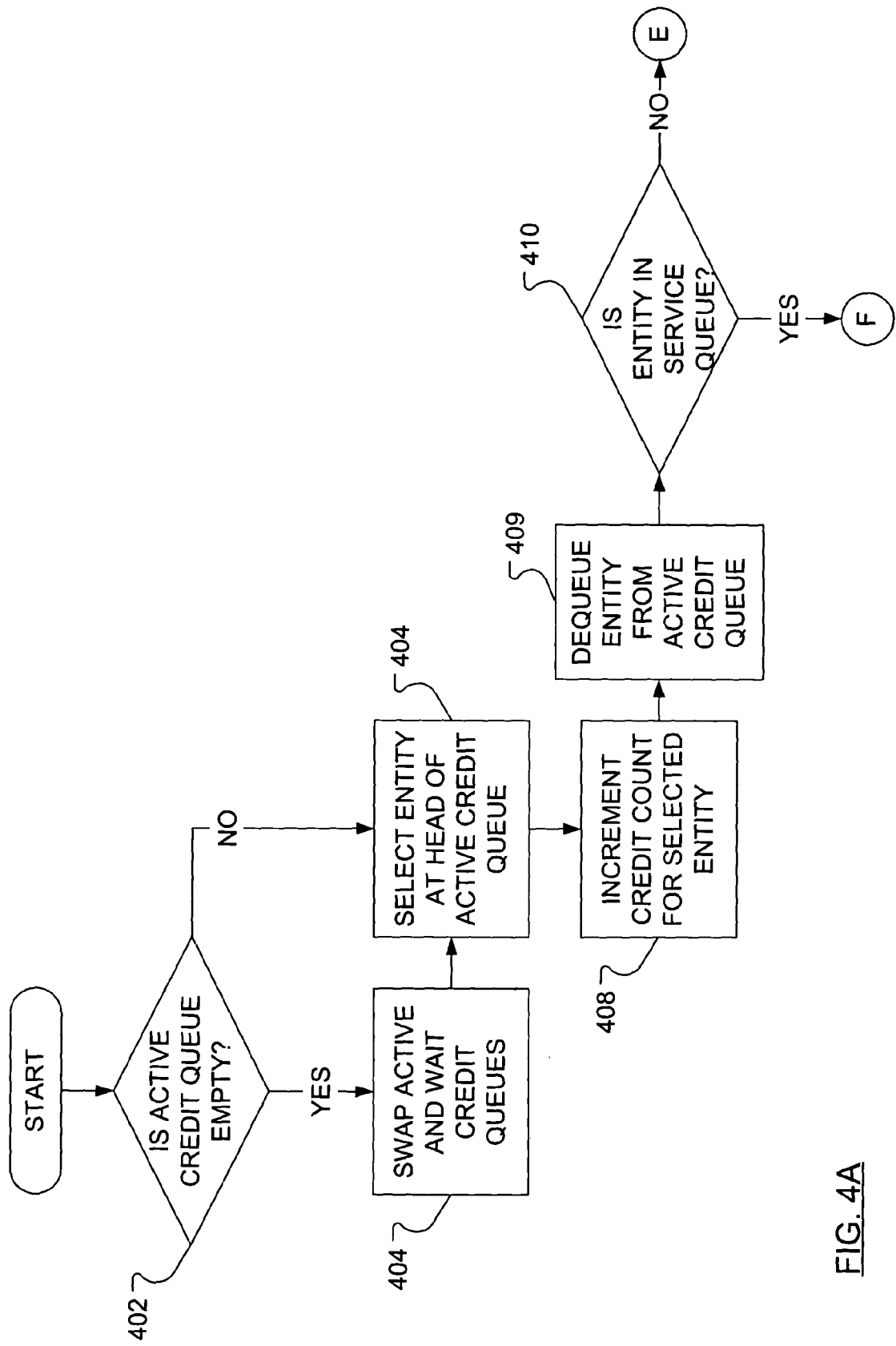
FIG. 4A illustrates initial steps of a credit management process according to an embodiment of the present invention.
Figure 4B:
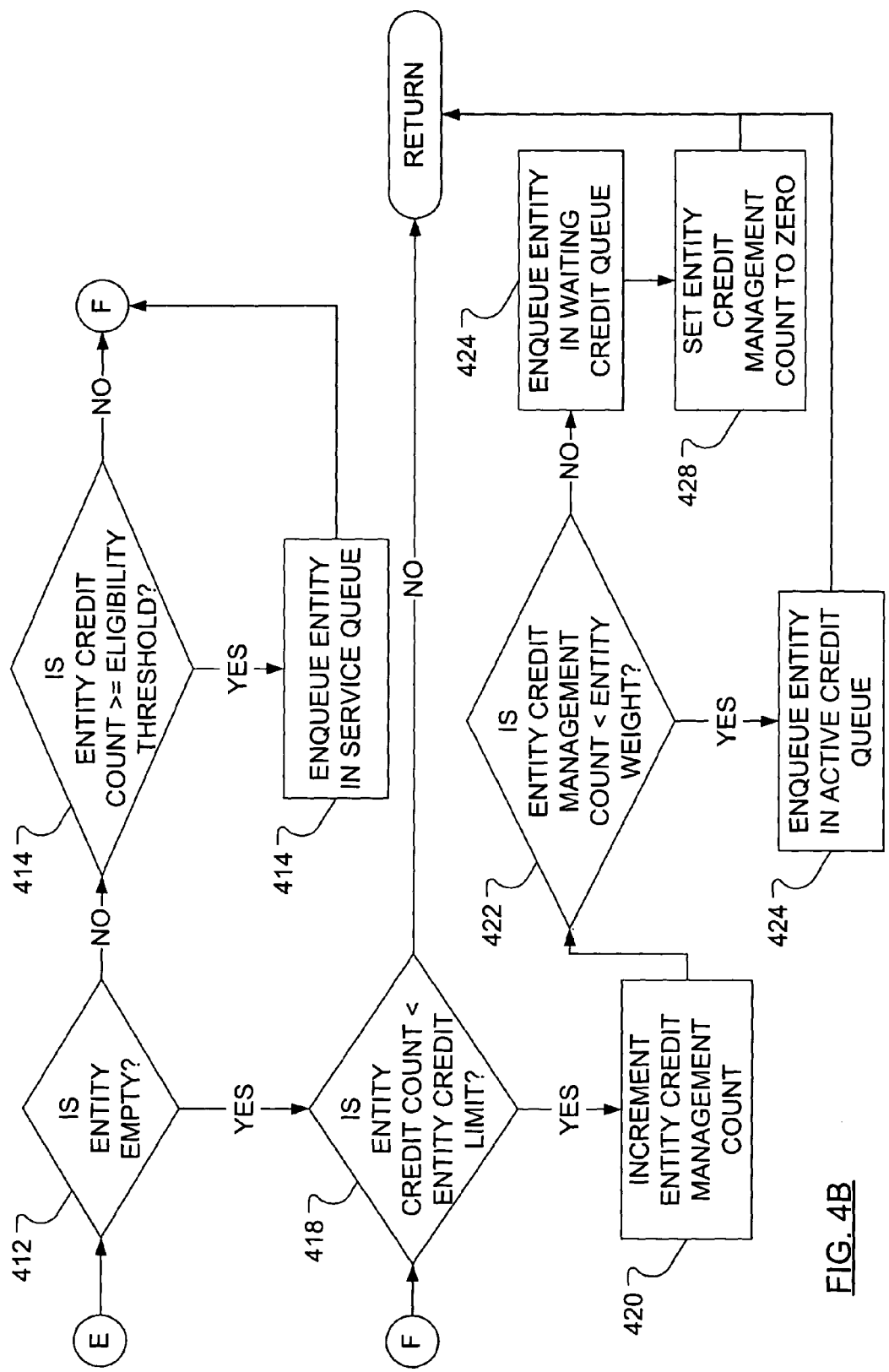
FIG. 4B illustrates final steps of the credit management process begun in FIG. 4A.

It is then determined whether the entity is empty (step 328, see FIG. 3C). If the entity is not empty, it is determined whether the credit count of the entity is greater than, or equal to, the eligibility threshold (step 330). If the credit count of the entity is greater than, or equal to, the eligibility threshold, the entity is re-queued in the service queue 104 (step 332) and the credit management process, to be described hereinafter in conjunction with FIGS. 4A and 4B, is called (step 334). However, if the credit count of the entity is less than the eligibility threshold, the credit management process is called (step 334) directly, i.e., with out re-queuing the entity in the service queue 104. Additionally, if the entity is determined to be empty in step 328, the credit management process is called (step 334) directly.

The credit management process may also be called (step 334) when, in step 318, it is determined that the cell buffer to be served does not contain the end of the packet being served and the entity is not in interleave mode, or, in step 322, it is determined that the consecutive services count is greater than, or equal to, the consecutive services limit.

Steps of the credit management process are outlined in FIGS. 4A and 4B. Associated with the credit management process are two credit queues, an active credit queue and a waiting credit queue. As was the case with the service queue 104, the credit queues are ordered lists of entity identifiers. The active credit queue holds identifiers of entities that require credits and are eligible to receive credits in the current round of credit distribution. The waiting credit queue holds identifiers of entities that require credits but are ineligible to receive credits until the next round of credit distribution. A round of credit distribution may be defined to begin when the active credit queue is found to be empty and the active credit queue is swapped with the waiting credit queue. In the following, it may be initially assumed that the active credit queue is the first credit queue 120 and the waiting credit queue is the second credit queue 122.

Initially, it is determined whether the active credit queue (first credit queue 120) is empty (step 402, see FIG. 4A). If the active credit queue is empty, the active credit queue and the waiting credit queue are swapped (step 404) such that the first credit queue 120 becomes the waiting credit queue and the second credit queue 122 becomes the active credit queue. After swapping the credit queues, or if the active credit queue is not empty, the entity at the head of the active credit queue is selected (step 406). The credit count of the selected entity is then incremented (step 408) and the entity is dequeued from the active credit queue (step 409). It is then determined whether the selected entity is in the service queue 104 (step 410).

If the selected entity is not in the service queue 104, it is determined whether the selected entity is empty (step 412). If the selected entity is not empty, it is determined (step 414) whether the increase in the credit count of the selected entity (step 408) made the credit count of the selected entity greater than or equal to the eligibility threshold for the service queue 104. If the credit count of the selected entity is greater than or equal to the eligibility threshold, the selected entity is enqueued in the service queue 104 (step 416). It is then determined whether the credit count of the selected entity is less than the credit limit of the selected entity (step 418). The decision of step 418 is also performed when it is determined in step 410 that the selected entity is already in the service queue 104 or when it is determined in step 412 that the selected entity is empty.

Once the credit count of the selected entity is equal to the credit limit of the selected entity, the credit management process is complete and program control is returned to the dequeue process (FIG. 3C). (Note that the credit count of the selected entity will not, in normal operation, exceed the credit limit of the selected entity.) If the credit count of the selected entity is less than the credit limit of the selected entity, the credit management count of the selected entity is incremented (step 420). It is then determined whether the credit management count of the selected entity remains less than the weight of the selected entity (step 422). If the credit management count of the selected entity remains less than the weight of the selected entity, the selected entity is enqueued at the tail of the active credit queue (step 424) and program control is returned to the dequeue process (FIG. 3C). In contrast, if the credit management count of the selected entity equals or exceeds the weight of the selected entity, the selected entity is queued in the waiting credit queue 122 (step 426). Subsequently, and before program control is returned to the dequeue process (FIG. 3C), the credit management count of the selected entity is reset to zero (step 428).

Essentially, the weight and credit management count of a given entity determines the rate at which the given entity receives credits. Each entity is assigned a weight and the credit management count of each entity is initialized to zero in step 508 of the enqueuing process, which is described in conjunction with FIG. 5, subsequent to the entity being placed in the waiting credit queue. Until the credit count of the entity reaches the entity credit limit, the credit management count is incremented each time the credit count of the entity is incremented by the credit management process. The value of the credit management count of an entity relative to the weight of the entity determines whether, after having received an increment to the credit count, the entity is re-queued in the active credit queue to receive further credits or queued in the waiting credit queue to wait to reach the head of the active credit queue, which will not occur until after the next swap of queues (step 404, FIG. 4A), before receiving another increment to the credit count.

Figure 5:
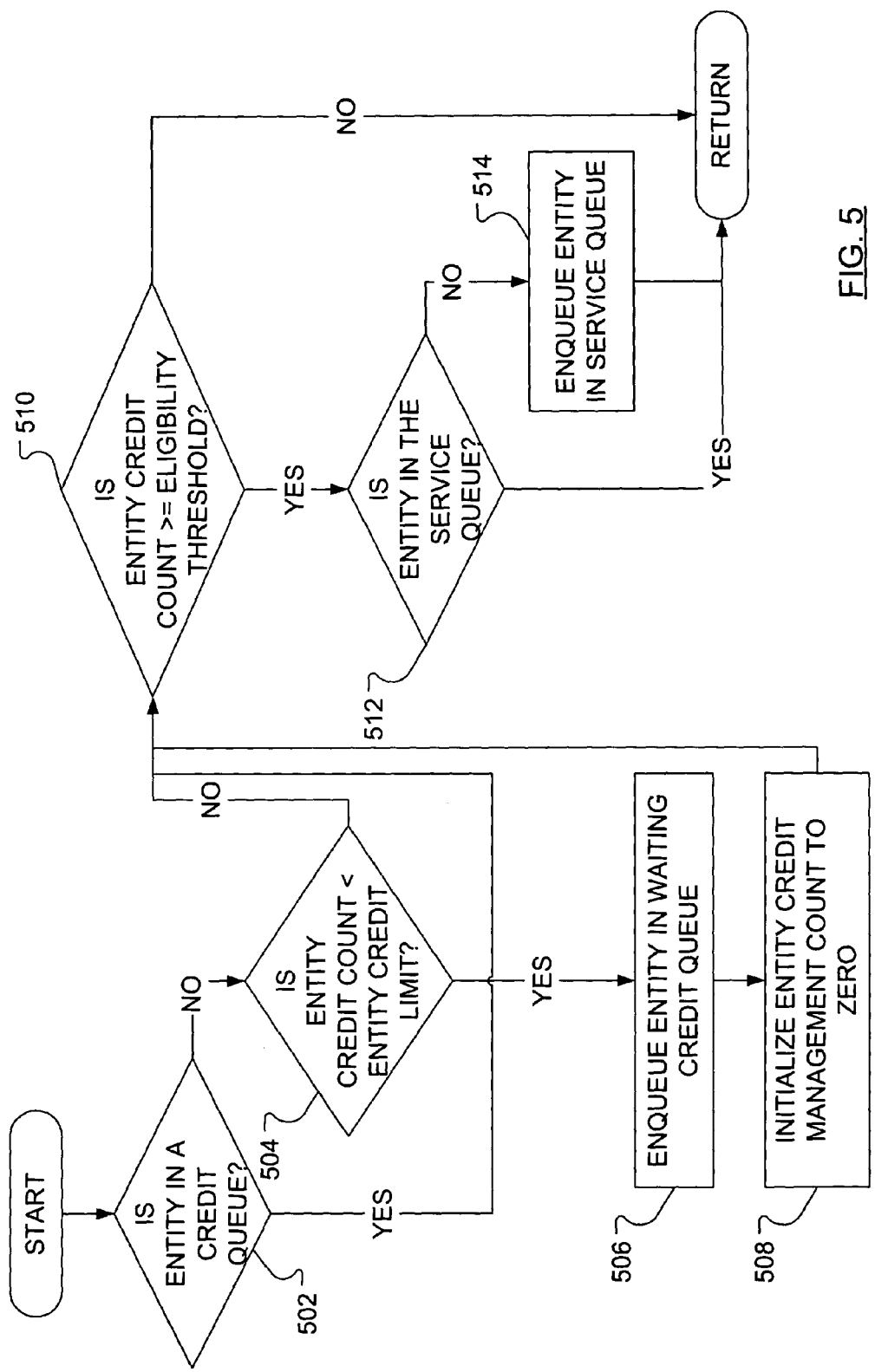
FIG. 5 illustrates steps in an enqueue process according to an embodiment of the present invention.

FIG. 5 illustrates steps of an enqueue process undertaken by the scheduler 102 when information is received that an entity has received new data to send. Initially, it is determined whether the entity is in a credit queue (step 502), i.e., in the active credit queue or in the waiting credit queue (see FIG. 1). If the entity is not present in a credit queue, it is determined whether the credit count for the entity is less than the credit limit for the entity (step 504). If the credit count for the entity is less than the credit limit for the entity, the scheduler enqueues the entity in the waiting credit queue (step 506) and initializes the credit management count of the entity to zero (step 508). After initializing the credit management count of the entity, or if the entity is already present in a credit queue, it is determined whether the credit count for the entity is greater than, or equal to, a predetermined eligibility threshold (step 510). If the credit count for the entity is greater than, or equal to, the predetermined eligibility threshold, it is then determined whether the entity is in the service queue 104 (step 512). If the entity is in the service queue 104, the enqueuing process is complete. Additionally, if the credit count for the entity is determined to be less than the predetermined eligibility threshold, the enqueuing process is complete. However, if the entity is not in the service queue 104 and the credit count for the entity is determined to be greater than or equal to the predetermined eligibility threshold, the entity is enqueued in the service queue 104 (step 514).

FIGS. 6A-6G provide a trace of the operation of an exemplary scheduler. Consider that the exemplary scheduler services three entity queues, named A, B and C, with weights of 1, 3 and 6, respectively. For simplicity, each queue is considered to be handling packets of a constant, unique length. In particular, queue A handles five cell packets, queue B handles two cell packets and queue C handles single cell packets. As an initial condition, consider that queue A contains three packets, queue B is backlogged with an effectively indefinite supply of packets and queue C contains 71 packets.

The enqueuing of data is not shown in the trace illustrated in FIGS. 6A-6G but is described here. First, all entity queues are initialized to be empty and to have zero credits and credit management counts. Also, the service queue, active credit queue, and waiting credit queue of the scheduler are all initialized empty. Queue A is then the first entity queue to have data enqueued. The enqueue process (FIG. 5) adds an identifier of queue A to the service queue and the waiting credit queue, making the identifier of queue A the first and only entity identifier in those queues. Subsequently, the enqueue process adds an identifier of queue B to the service queue and the waiting credit queue and then the enqueue process adds an identifier of queue C to the service queue and the waiting credit queue. Thus the service queue and waiting credit queue contain the identifiers of queues A, B and C, with the identifiers of queue A at the head.

The trace illustrated in FIGS. 6A-6G shows the choices made by the dequeue process (FIGS. 3A, 3B, 3C) and the credit management process (FIGS. 4A and 4B) at each dequeue opportunity, one dequeue opportunity per row. The legend for the column headers is as follows:

TIME—a sequential ordinal number identifying the dequeue opportunity;

DQ—the queue selected for service by the dequeue process;

CR—the queue selected to receive a credit by the credit management process;

SQ—the service queue;

ACQ—the active credit queue;

WCQ—the waiting credit queue;

CREDIT—the credit count of a queue; and

CM_COUNT—the credit management count of a queue.

CELLS—the number of cells remaining in a queue.

Note that SQ, ACQ, WCQ, CREDIT, CELLS and CM_COUNT are all shown after being updated for the current dequeue opportunity (TIME=1).

Comments about various dequeue opportunities are made here.

TIME=1 (FIG. 6A): The first dequeue opportunity. Queue A is selected for service since the identifier of queue A was at the head of the service queue. This selection costs queue A one credit. This service starts a packet from queue A, so queue A remains at the head of the SQ (if so configured). The credit management process finds the ACQ empty and swaps the WCQ in its place. The credit management process then finds the identifier of queue A at the head of the ACQ and gives queue A one credit. This offsets the credit taken by the dequeue process so the credit count for queue A remains at zero. The CM_COUNT for queue A is incremented to 1, which matches its weight, so the identifier of queue A is moved from the ACQ to the WCQ, and the CM_COUNT of queue A is zeroed.

TIME=2 (FIG. 6A): Queue A is selected for service again because the identifier of queue A has not been removed from the head of the service queue, since queue A is in the middle of a packet.

TIME=5 (FIG. 6A): Queue A is selected for service again. This is the final cell of the current packet for queue A. The scheduler finds the credit count (CREDIT) for queue A to be negative, making queue A ineligible for more service now, so the identifier of queue A is removed from the SQ, but remains in the ACQ or WCQ (WCQ in this case) in order to earn back credits.

TIME=10 (FIG. 6A): The credit management count (CM_COUNT) for queue C has been incremented up to the weight (6) of queue C and the identifier of queue C has thus been moved into the WCQ. The ACQ is now empty.

TIME=11 (FIG. 6A): The credit management process, upon starting with the empty ACQ, swaps the ACQ and the WCQ.

TIME=41 (FIG. 6C): Queue A is selected for another credit, which finally brings the credit count (CREDIT) for queue A back to zero, making queue A eligible for more service. Thus, the identifier of queue A is added to the end of the SQ.

TIME=97 (FIG. 6E): The final cell of the third and last packet in queue A is served so queue A has no more data and the identifier of queue A is removed from the SQ. Note, however, that queue A has a negative credit count and so an identifier of queue A remains in a credit queue in order to earn enough credits to bring the credit count of queue A back to zero.

TIME=111 (FIG. 6F): The state at this point exactly matches the state at time=11 (FIG. 6A). If the queues had sufficient data, operation would repeat this cycle with a period of 100. Such a period forms a valid interval over which to measure the exact performance of the exemplary scheduler. Counting the cells served per queue from TIME=11 to TIME=110, inclusive, we find 10 cells served from queue A, 30 cells served from queue B and 60 cells served from queue C, in exact proportion to their weights of 1, 3 and 6.

TIME=119 (FIG. 6F): Queue C receives a credit, bringing the credit count for queue C to 5, which matches the number of cells left in queue C. Consequently, queue C is no longer eligible to earn more credits and is removed from the credit queues, even though queue C still has data and remains in the service queue. The credit management count (CM_COUNT) for queue C remains as is; if C receives more data, the enqueue process will zero the credit management count of queue C when the enqueue process places an identifier of queue C in the WCQ.

TIME=128 (FIG. 6G): Queue A is selected to earn a credit and this brings the credit count for queue A back to zero. Since queue A has no other data, queue A cannot earn more credits and the identifier of queue A is removed from the ACQ.

ADVANTAGES

The time needed by an algorithm, expressed as a function of the size of the problem, is called the time complexity of the algorithm. The limiting behavior of the time complexity as the size increases is called the asymptotic time complexity. It is the asymptotic time complexity of an algorithm that ultimately determines the size of problems that can be solved by the algorithm. If an algorithm processes inputs of size n in time $cn^2$ for some constant c, then it is said that the time complexity of that algorithm is $O(n^2)$, read "order $n^2$."

The time complexity of the method presented herein may be shown to be $O(1)$. The $O(1)$ property of the method allows the scheduler 102 to scale to schedule a large number of entities. Furthermore, the $O(1)$ property of the method provides for a deterministic execution time.

Further advantageously, the method does not require advance knowledge of packet length or packet-level linking of cells. Notably, the method is packet/cell neutral, i.e., the method can serve cells as easily as packets. Hereinbefore, the term "packet" has been used herein generically to refer to a unit of data traffic, which may, for instance, be a cell, a frame, etc.

Having an $O(1)$ time complexity is frequently desirable in building schedulers because the performance of such schedulers is independent of the number of queues scheduled.

Other modifications will be apparent to those skilled in the art and, therefore, the invention is defined in the claims.

I claim:

1. A method of serving a plurality of input queues that store packets of data traffic to be transmitted, said data traffic stored in fixed-size units of storage in the input queues, said method comprising the steps of:
   associating a credit count with each of said plurality of input queues;
   maintaining a service queue containing a list of input queues that have a positive credit count and which have data traffic stored therein to be transmitted;
   selecting one of the input queues from the service queue to be served;
   transmitting data from one of the said fixed-size units of storage of the input queue selected to be served;
   reducing, by a predetermined quantity, said credit count associated with the input queue selected to be served; and
   determining whether further fixed-size units of storage are to be transmitted from the input queue selected to be served.

2. The method of claim 1, wherein, if it is determined that further fixed-size units of storage are to be transmitted from the input queue selected to be served, the method further comprises the step of repeating the steps of transmitting, reducing and determining until it is determined that further fixed-size units of storage are not to be transmitted from the input queue selected to be served.

3. The method of claim 2, wherein the step of determining comprises determining whether the fixed-size unit of storage that was most recently transmitted is the last fixed-size unit of storage associated with a variable length packet.

4. The method of claim 1, wherein the step of determining results in a negative determination while the method is operating in an interleave mode.

5. The method of claim 1, further comprising the steps of:
   selecting at least one of the other input queues to receive credits that were reduced from the selected input queue; and
   increasing, by said predetermined quantity, an associated credit count of the at least one other input queue selected to receive credits such that credits are not created or destroyed but rather moved between input queues as used.

6. The method of claim 1, wherein the service queue contains an ordered list of identities of input queues that have a positive credit count and which have data traffic stored therein to be transmitted, and wherein the step of selecting one of the input queues from the service queue to be served comprises selecting an input queue that is at a head-end of the ordered list.

7. The method of claim 6, the method further comprising the steps of determining whether the input queue selected to be serviced should be removed from the service queue after being served, or if the identity of the input queue selected to be serviced should be placed at a tail-end of the ordered list of identities of input queues contained in the service queue after being served.

8. The method of claim 7, wherein the identity of the input queue selected to be serviced will be placed at a tail-end of the ordered list of identities of input queues contained in the service queue after being served if the input queue selected to be serviced continues to have data to be serviced and continues to have a positive credit count after the method has completed transmitting data from the fixed size units of storage and the step of determining has resulted in a determination that further fixed-size units of storage are not to be transmitted from the input queue selected to be served.

9. A scheduler adapted to serve a plurality of input queues that store packets of data traffic to be transmitted, said data traffic stored in fixed-size units of storage in the input queues, said scheduler adapted to:
   associate a credit count with each of said plurality of input queues;
   maintain a service queue containing a list of input queues that have a positive credit count and which have data traffic stored therein to be transmitted;
   select one of the input queues from the service queue to be served;

transmit data from one of the said fixed-size units of storage of the input queue selected to be served;

reduce, by a predetermined quantity, said credit count associated with the input queue selected to be served; and determine whether further fixed-size units of storage are to be transmitted from the input queue selected to be served.

10. A scheduler adapted to serve a plurality of input queues that store packets of data traffic to be transmitted, said data traffic stored in fixed-size units of storage in the input queues, said scheduler comprising:

means for associating a credit count with each of said plurality of input queues;

means for maintaining a service queue containing a list of input queues that have a positive credit count and which have data traffic stored therein to be transmitted;

means for selecting one of the input queues from the service queue to be served;

means for transmitting data from one of the said fixed-size units of storage of the input queue selected to be served;

means for reducing, by a predetermined quantity, said credit count associated with the input queue selected to be served; and means for determining whether further fixed-size units of storage are to be transmitted from the input queue selected to be served.

11. A tangible computer readable medium containing computer-executable instructions which, when performed by a processor in a scheduler adapted to serve a plurality of input queues that store packets of data traffic to be transmitted and input queue schedulers associated with other queues of data to be transmitted, said data traffic stored in fixed-size units of storage, cause the processor to:

associate a credit count with each of said plurality of input queues and input queue schedulers;

maintain a service queue containing a list of input queues and input queue schedulers that have a positive credit count and which have data traffic stored therein or associated therewith to be transmitted;

select one of the input queues or input queue schedulers from the service queue to be served;

transmit data from one of the said fixed-size units of storage of the input queue selected to be served or from the input queue scheduler selected to be served;

reduce, by a predetermined quantity, said credit count associated with the input queue selected to be served or the input queue scheduler selected to be served; and determine whether further fixed-size units of storage are to be transmitted from the input queue selected to be served or from the input queue scheduler selected to be served.

12. A method of distributing credits among a plurality of input queues that store packets of data traffic to be transmitted, said method comprising:

maintaining an active credit queue containing an ordered list of input queues that require credits and are eligible to receive credits during a current round of credit distribution;

maintaining a waiting credit queue containing an ordered list of input queues that require credits but are ineligible to receive credits until the next round of credit distribution;

obtaining a credit from a first of the input queues in connection with transmission of data from the first input queue;

selecting a second of the input queues from the active credit queue; and increasing, by a predetermined quantity, a credit management count of the second of the input queues.

13. The method of claim 12, wherein the active credit queue contains an ordered list of identifiers of the input queues, and wherein the second of the input queues is selected by selecting an identifier at a head end of the active credit queue.

14. The method of claim 12, further comprising the step of determining if the credit management count of the second of the input queues is equal to or greater than a weight of the second input queue and, if so removing the second of the input queues from the active credit queue and placing the second input queue in the waiting credit queue.

15. The method of claim 12, further comprising the step of determining if the credit management count of the second of the input queues is less than a weight of the second input queue and, if so, moving the second of the input queues to a tail end of the active credit queue.

16. The method of claim 14, further comprising the step of, after the step of removing the second of the input queues from the active credit queue, determining whether the active credit queue is empty.

17. The method of claim 16, further comprising the step of, if the active credit queue is empty, swapping the waiting credit queue for the active credit queue so that the waiting credit queue is considered to be the active credit queue.

18. A scheduler adapted to serve a plurality of input queues that store packets of data traffic to be transmitted, said data traffic stored in fixed-size units of storage, said scheduler adapted to:

maintain an active credit queue containing an ordered list of input queues that require credits and are eligible to receive credits during a current round of credit distribution;

maintain a waiting credit queue containing an ordered list of input queues that require credits but are ineligible to receive credits until the next round of credit distribution;

obtain a credit from a first of the input queues in connection with transmission of data from the first input queue;

select a second of the input queues from the active credit queue; and increase, by a predetermined quantity, a credit management count of the second of the input queues.

19. A scheduler adapted to serve a plurality of input queues that store packets of data traffic to be transmitted, said data traffic stored in fixed-size units of storage, said scheduler comprising:

means for maintaining an active credit queue containing an ordered list of input queues that require credits and are eligible to receive credits during a current round of credit distribution;

means for maintaining a waiting credit queue containing an ordered list of input queues that require credits but are ineligible to receive credits until the next round of credit distribution;

means for obtaining a credit from a first of the input queues in connection with transmission of data from the first input queue;

means for selecting a second of the input queues from the active credit queue; and means for increasing, by a predetermined quantity, a credit management count of the second of the input queues.

20. A tangible computer readable medium containing computer-executable instructions which, when performed by a processor in a scheduler adapted to serve a plurality of input queues that store packets of data traffic to be transmitted and input queue schedulers associated with other queues of data to be transmitted, said data traffic stored in fixed-size units of storage, cause the processor to:

maintaining an active credit queue containing an ordered list of input queues and input queue schedulers that require credits and are eligible to receive credits during a current round of credit distribution;

maintaining a waiting credit queue containing an ordered list of input queues and input queue schedulers that require credits but are ineligible to receive credits until the next round of credit distribution;

obtaining a credit from a first of the input queues or input queue schedulers in connection with transmission of data from the first input queue;

select a second of the input queues or input queue schedulers from the active credit queue; and increase, by a predetermined quantity, a credit management count of the selected input queue or input queue schedulers.

\* \* \* \* \*